A. S. FRASER.
WHEEL CONSTRUCTION.
APPLICATION FILED FEB. 7, 1917.
1,236,921. Patented Aug. 14, 1917.
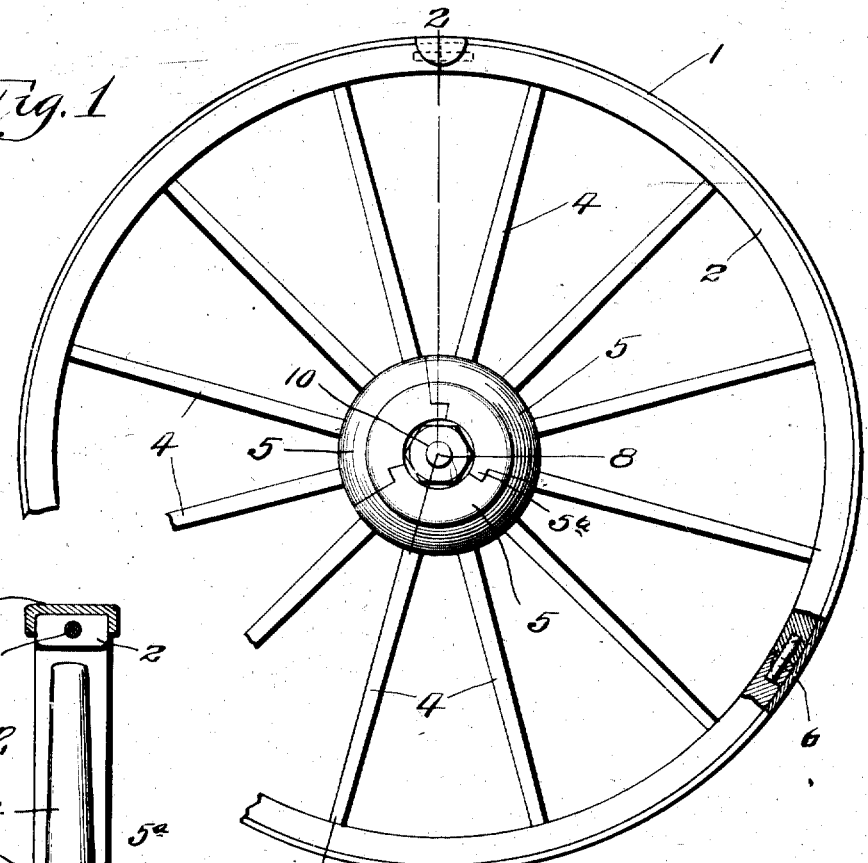
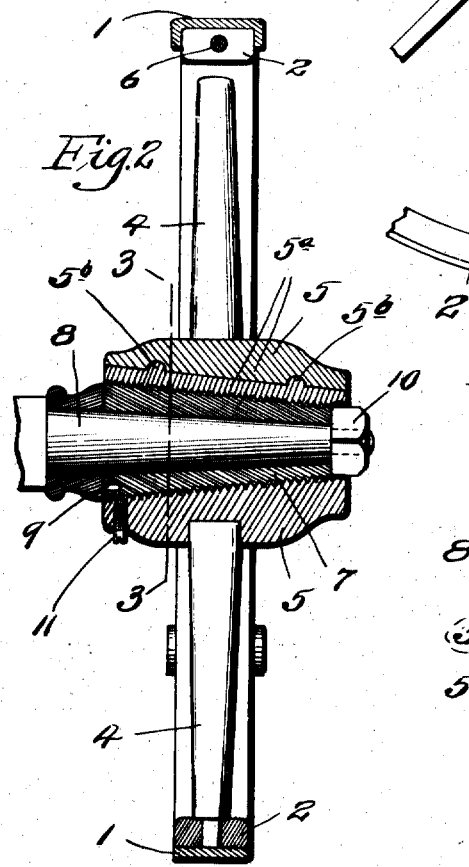
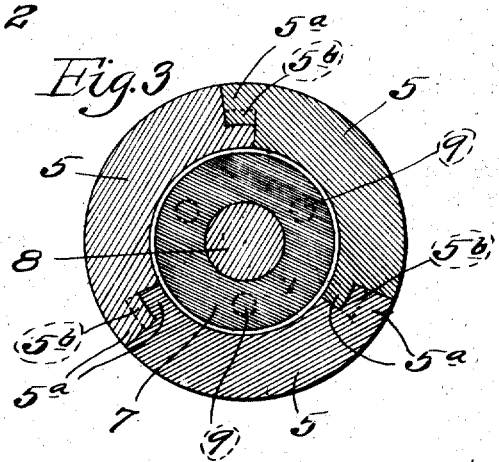
Inventor
Alexander S. Fraser
By F. R. Cornwall, Atty.

UNITED STATES PATENT OFFICE.

ALEXANDER S. FRASER, OF CAIRO, ILLINOIS.

WHEEL CONSTRUCTION.

1,236,921.  Specification of Letters Patent.  Patented Aug. 14, 1917.

Application filed February 7, 1917. Serial No. 147,229.

*To all whom it may concern:*

Be it known that I, ALEXANDER S. FRASER, a citizen of the United States, residing at the city of Cairo, county of Alexander, and State of Illinois, have invented a certain new and useful Improvement in Wheel Construction, of which the following is a full, clear, and exact description, such as will enable others skilled in the art to which it appertains to make and use the same, reference being had to the accompanying drawings, forming part of this specification.

This invention relates to wheel construction, and particularly to a construction for vehicle wheels having a metallic tire which forms a retaining member for the other portions of the structure and a bearing surface for the roadway upon which the wheel is run.

It is a common experience, particularly in the use of wagon wheels built up of wooden parts including hub, spokes and felly, that, due to the drying out of the wooden portions, and the expansion of the metallic tire from heat, the tire becomes loose on the felly or wheel rim, necessitating the reshrinking of the tire in place. In addition to the actual cost of having this work performed, it requires a considerable time, during which period the wagon is necessarily out of commission.

From the same cause, the spokes in a built-up wheel sometimes become loosened to some extent, whereupon it is imperative that the wheel receive immediate attention for the correction of this fault, else the wheel will soon collapse.

It is the purpose of my invention to provide an economical wheel construction suitable for use on farm wagons and the like wherein the metallic tire will always be kept tight upon the felly, and the spokes will be kept tight in the hub and in the felly.

In this connection, it is more particularly my purpose to provide a construction wherein the tightening operation may either result automatically from the employment of the wheel in its usual function, or may be quickly and easily accomplished without actually removing the vehicle from service.

As ancillary objects, it is my purpose to provide a wheel construction having these attributes, and having a minimum number of parts, the simplest possible construction, maximum strength and the lowest practical cost.

These various objects, together with others which will be obvious or hereinafter pointed out, are obtained by the construction illustrated in the accompanying drawings, showing one embodiment of my invention and in which—

Figure 1 represents a partial side elevation of a built-up wheel, a portion being in section;

Fig. 2 represents a sectional elevation taken substantially on line 2—2 of Fig. 1; and Fig. 3 represents a detail of the hub, being a section taken substantially on line 3—3 of Fig. 2.

From an examination of these drawings, it will be understood that 1 represents the steel tire of the wheel, 2 the felly, 4 the spokes, and 5 the hub. The tire may be in the form of the usual continuous circular strap or band of wear-resisting material, and the spokes may be of any of the customary or desired forms. The felly may also be constructed in the usual fashion of a plurality of sections joined by dowels 6, and having the outer extremities of the spokes seated therein or attached thereto. The hub 5 is of segmental construction, i. e., it is made up of a plurality of complementary portions arranged to be closely but slidably assembled in the proper relationship to form a hub of the desired contour. As illustrated, these segmental hub portions are formed with overlapping portions $5^a$, upon which are formed the registering tongue and groove portions $5^b$ extending transversely of the axis of the hub. The inner extremities of the spokes 4 are firmly seated in the segmental hub portions, as illustrated in Fig. 2.

The dimensions and form of the segmental hub portions are such that, when assembled in complementary relationship, the segmental portions form a hub of the desired contour having an axial opening of frusto-conical form. The inner surfaces of the segmental hub portions thus assembled, are provided with a continuous thread throughout such portion of the length of the hub as may be necessary for the purpose hereinafter described.

Arranged for engagement within this axial aperture and screw-threaded for cooperative association with the threaded faces of the hub segments, is a frusto-conical thimble or expanding member 7 formed with an axial aperture for the accommodation of the axle skein 8. This expanding member is permitted normally to rotate upon the axle skein with the revolution of the wheel, and is provided with spanner seats 9 whereby it may be retained against rotation or may be rotated itself relative to the wheel. Suitable means 10 is arranged for retaining the wheel upon the axle.

The operation of the device is obvious from the foregoing. Whenever, due to the expansion of the tire 1 or the shrinkage of the felly or spoke portions, the tire becomes loose upon the wheel, the tire may be tightened in place by screwing the expanding member 7 farther into the converging axial aperture, which operation will have the effect of expanding the hub, due to its segmental construction and the movability of the component segments. This expansive movement of the hub portions will be transmitted through the spokes to the felly portions, with the result that the entire wheel structure will be tightened or expanded against the tire. If desired, any suitable means, such as a set screw 11, may be utilized to retain the expanding member 7 in proper relationship to the hub portions. If, however, the pitch of the thread is in the direction which will tend to screw the hub portions farther onto the expanding member when the wheel is rotated in the normal direction of its use, such a retaining means may be dispensed with. This is due to the fact that, with the thread arranged in the manner described, the tightening operation will be going on constantly while the wheel is in use, and practically will be accomplished without volitional attention. This is due to the fact that such friction as there is between the member 7 and the axle skein will cause the hub portions to work inwardly on the thread.

It will be observed that with this construction there is no necessity of employing loose spokes, but that on the contrary, the operation of the device tends to keep the spokes tight. This provides an exceptionally sturdy wheel in which the built-up portions are retained constantly under compression by the tire.

The overlapping portions 5ª afford the proper amount of distance for the requisite play of the hub segments, while the registering tongue and groove portions 5ᵇ hold the hub segments constantly in proper alinement.

In the manufacture of the device, the hub segments may be of cast metal if desired, or they may be of wood and lined on their concave faces with metal in which the thread is cut.

I am aware that my invention may be embodied in a variety of forms differing in various particulars and features from that herein shown and described without departing from the essence and scope of the invention as indicated in the accompanying claims.

What I claim is:

1. In a wheel construction, the combination of relatively movable felly portions, relatively movable complementary hub portions, radial members connecting the hub portions with felly portions, a continuous tire portion circumscribing and supported upon the felly portions, an expanding member associated with the hub portions, and an axle member upon which said expanding member is rotatably mounted to form the bearing for the wheel, said hub portions and said expanding member being susceptible of relative movement whereby the spacial relationship of the hub portions to one another may be altered.

2. In a wheel construction, the combination of relatively movable complementary hub portions, radial members fixed therein, relatively movable felly portions mounted at the outer extremities of the radial members, a circumscribing tire supported upon and arranged to retain the felly members, a stationary axle, and an expanding member rotatably associated with the axle and the hub members whereby the spacial relationship of the latter may be altered to stress the radial and felly members against the tire.

3. In a wheel construction, the combination of a supporting axle, a tapering expanding member arranged for rotation thereon, a plurality of complementary relatively movable hub portions having circumferential screw-thread engagement with the expanding member, a tire, and members fixed for movement with the hub portions and associated with the tire to support the latter concentrically with the expanding member, the thread upon the latter being pitched toward its larger extremity in the direction of normal rotation of the wheel.

4. In a wheel construction, the combination of a frusto-conical expanding member arranged for axial bearing upon a suitable axle, a plurality of relatively movable complementary hub portions having screw-thread engagement with the conical face of the expanding member, radial members fixed in the hub portions, and a circumscribing member forming the perimeter of the wheel operably associated with the radial members; the screw thread on the expanding member being pitched toward its larger base in the direction of the normal rotation of the wheel.

5. In a wheel construction, the combination of a plurality of relatively movable complementary hub portions, said hub portions including means for retaining them in alinement, an expanding member having screw engagement with the hub portions and movable to vary their spacial relationship, a circumscribing tire arranged concentrically with the hub portions, relatively movable members fixed to the hub portions and operably associated with the tire, and an axle upon which the expanding member is mounted for rotation.

In testimony whereof I hereunto affix my signature this 2nd day of February, 1917.

ALEXANDER S. FRASER.